United States Patent
Jiao et al.

(10) Patent No.: US 10,320,666 B2
(45) Date of Patent: Jun. 11, 2019

(54) METHOD AND DEVICE FOR PROCESSING ROUTING STATUS AND/OR POLICY INFORMATION

(71) Applicant: ZTE Corporation, Shenzhen (CN)

(72) Inventors: Lin Jiao, Shenzhen (CN); Chong Feng, Shenzhen (CN); Xianxian Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 3 days.

(21) Appl. No.: 15/542,159

(22) PCT Filed: Jul. 2, 2015

(86) PCT No.: PCT/CN2015/083220
§ 371 (c)(1),
(2) Date: Jul. 7, 2017

(87) PCT Pub. No.: WO2016/115836
PCT Pub. Date: Jul. 28, 2016

(65) Prior Publication Data
US 2018/0270149 A1    Sep. 20, 2018

(30) Foreign Application Priority Data

Jan. 22, 2015 (CN) .......................... 2015 1 0033670

(51) Int. Cl.
*H04L 12/725* (2013.01)
*H04L 12/715* (2013.01)
(Continued)

(52) U.S. Cl.
CPC .............. *H04L 45/64* (2013.01); *H04L 29/08* (2013.01); *H04L 41/0806* (2013.01);
(Continued)

(58) Field of Classification Search
CPC ... H04L 45/64; H04L 41/0893; H04L 45/302; H04L 41/0806; H04L 47/20
See application file for complete search history.

(56) References Cited

U.S. PATENT DOCUMENTS 9,294,393 B1 *  3/2016  Mullooly ................ H04L 41/12
2013/0223226 A1   8/2013  Narayanan
(Continued)

FOREIGN PATENT DOCUMENTS

| CN | 103780471 A | 5/2014 |
| CN | 104301230 A | 1/2015 |
| CN | 104301249 A | 1/2015 |

OTHER PUBLICATIONS

International Search Report for corresponding application PCT/CN2015/083220 filed on Jul. 2, 2015; dated Oct. 23, 2015.
(Continued)

*Primary Examiner* — Jay P Patel
(74) *Attorney, Agent, or Firm* — Cantor Colburn LLP

(57) ABSTRACT

A method and device for processing at least one of routing status and policy information is provided. The method includes: a routing or forwarding system receives a first request for establishing a connection sent by a SDN control client, and the first request carries an identifier of the SDN control client; the routing or forwarding system establishes a corresponding relationship between at least one of routing status and policy information sent by the SDN control client and the identifier; and the routing or forwarding system manages at least one of the routing status and policy information according to the corresponding relationship.

12 Claims, 6 Drawing Sheets

(51) Int. Cl.
  *H04L 29/08* (2006.01)
  *H04L 12/24* (2006.01)
  *H04L 12/813* (2013.01)
(52) U.S. Cl.
  CPC ...... *H04L 41/0853* (2013.01); *H04L 41/0893* (2013.01); *H04L 45/302* (2013.01); *H04L 67/141* (2013.01); *H04L 47/20* (2013.01)

(56) References Cited

U.S. PATENT DOCUMENTS

| | | | | |
|---|---|---|---|---|
| 2013/0266007 | A1* | 10/2013 | Kumbhare | H04L 45/56 370/389 |
| 2015/0358236 | A1* | 12/2015 | Roach | H04L 43/065 370/235 |
| 2016/0050117 | A1* | 2/2016 | Voellmy | H04L 12/6418 370/392 |
| 2016/0179183 | A1* | 6/2016 | Rallo | G06F 1/3287 713/320 |
| 2017/0034058 | A1* | 2/2017 | Sampath | H04L 12/6418 |
| 2017/0250869 | A1* | 8/2017 | Voellmy | H04L 41/0893 |
| 2017/0318517 | A1* | 11/2017 | Hu | H04W 40/246 |

OTHER PUBLICATIONS

A. Atlas Juniper Networks et al. "An Architecture for the Interface to the Routing System draft-ietf-i2rs-architecture-08.txt", Internet Engineering Task Force, IETF; Standardworkingdraft, Internet Society (ISOC), vol. 4, Jan. 7, 2015, pp. 1-32 XP015103872.

Ramon Casellas et al. "SDN Orchestration of OpenFlow and GMPLS Flexi-Grid Networks with a Stateful Hierarchical PCE [Invited]", Journal of Optical Communications and Networking, Institute of Electrical and Electronics Engineering, Jan. 1, 2015, vol. 7, No. 1, XP011571339.

Supplemental EP Search Report dated Jun. 26, 2018 re: Application No. EP 15 87 8508, pp. 1-10, citing: Ramon Casellas et al. "SDN Orchestration of OpenFlow . . . " and Juniper Atlas et al. "An Architecture for the Interface . . . "

* cited by examiner

METHOD AND DEVICE FOR PROCESSING ROUTING STATUS AND/OR POLICY INFORMATION

TECHNICAL FIELD

The present disclosure relates to the field of communications, and in particular to a method and device for processing at least one of routing status and policy information.

BACKGROUND

As current networks expose more and more disadvantages and people have higher and higher requirements on network performances, researchers have to add many complex functions to a system architecture of a routers, for example, Open Shortest Path First (OSPF), Border Gateway Protocol (BGP), multicast, differentiated service, traffic engineering, Network Address Translation (NAT), firewall, Multi Protocol Label Switching (MPLS), and so on. Consequently, a switching device such as router becomes more and more bloated and a performance improvement space becomes smaller and smaller.

However, totally different from a dilemma of a network field, a computer field gets a rapid development. With a careful review of a development of the computer field, it is not difficult to find that the key lies in that the computer field finds a simple and useful hardware underlayer (x86 instruction set). Due to such a public hardware underlayer, in a software aspect, both applications and operating systems get rapid developments. At present, many people advocating to redesign a computer network system architecture think that: network can solve all problems currently confronted by a network by copying a success of the computer field. Under a guide of this idea, further network likes this: underlying data paths such as switch and router are "mute, simple and minimum", a public open Application Programming Interface (API) is defined, and meanwhile a controller is adopted to control the whole network. Future researchers freely call a underlying API on the controller to program so as to realize an innovation of network.

Based on the above theory, a Software Defined Network (SDN) appears. The SDN provides users with a more accurate and personalized customization means for network by taking an open programmable interface and control-forwarding separation as main features, has a broad application prospect at the cloud computation data centre, the edge access field even the network core node, and will certainly have a deep influence on a network development direction of next decades.

In recent years, an SDN technology represented by Openflow receives widespread and enthusiastic concerns. A main feature of the Openflow is a separation of a control plane and a forwarding plane. The control plane is moved up to a controller running on a server. Network devices reserve a forwarding function, and control information is transmitted through an Openflow protocol between the control plane and the forwarding plane to instruct forwarding behaviors of the network devices. The Openflow protocol allows users to obtain means for more directly controlling the forwarding behaviors of devices, but also brings many problems. These problems mainly includes that: one, a control-forwarding separation architecture is not beneficial for orderly evolution of traditional network devices, and two, there is no special Openflow chip, flow table information needs soft unlock and thus influences effective speeds of flow tables. Based on the above problems, Internet Engineering Task Force (IETF) proposes a concept of opening an Interface to the Routing System (I2RS), which solves a problem of traditional network devices orderly evolving to the SDN by opening an interface of a routing system on the control plane.

FIG. 1 is a structural block diagram of an I2R2 system in the related art. As shown in FIG. 1, a core idea is to open an interface to communicate with at least one external control client on a basis of a routing-forwarding system of a present traditional network device. The at least one external control Client dynamically sends routing status, policy and so on to each agent through events, topology change, traffic statistic and other information fed back by devices. The same as traditional configuration management ideas, a routing-forwarding system on a device generally does not distinguish routing status and policy of home control clients. However, this mode is not beneficial for an accurate management of a management layer.

In view of the problem that at least one of routing status and policy information of home control clients are not distinguished in the related art, an effective solution has not been provided yet.

SUMMARY

At least some embodiments of present disclosure are to provide a method and device for processing at least one of routing status and policy information, so as at least to partially solve a problem that at least one of routing status and policy information of home control clients are not distinguished in the related art.

In an embodiment of the present disclosure, a method for processing at least one of routing status and policy information is provided, which includes that: receiving, by a routing or forwarding system, a first request for establishing a connection sent by a Software Defined Network (SDN) control client, wherein the first request carries an identifier of the SDN control client; establishing, by the routing or forwarding system, a corresponding relationship between at least one of routing status and policy information sent by the SDN control client and the identifier; and managing, by the routing or forwarding system, at least one of the routing status and policy information according to the corresponding relationship.

In one embodiment, after the routing or forwarding system establishes a connection with the SDN control client, the method further includes: setting, by the routing or forwarding system, a mapping relationship between the identifier and a priority of the SDN control client; and marking, by the routing or forwarding system, the priority of the SDN control client corresponding to the identifier on at least one of the routing status and policy information sent by the SDN control client according to the mapping relationship.

In one embodiment, after marking, by the routing or forwarding system, the priority of the SDN control client corresponding to the identifier on at least one of the routing status and policy information sent by the SDN control client according to the mapping relationship, the method further includes: when a plurality of SDN control clients have a conflict in operating at least one of the routing status and policy information, handling, by the routing or forwarding system, the conflict according to the priority marked on at least one of the routing status and policy information.

In one embodiment, handling, by the routing or forwarding system, the conflict according to the priority marked on at least one of the routing status and policy information includes: triggering, by the routing or forwarding system, the SDN control client to handle at least one of the routing status and policy information of the SDN control client and at least one of the routing status and policy information of at least one SDN control client with a priority lower than the priority of the SDN control client, wherein handling operations include at least one of the following: modification operation and deletion operation.

In one embodiment, a priority is configured by the SDN control client and carried in the first request or is an initial configuration provided by the routing or forwarding system, and the identifier is a global unique identifier.

In one embodiment, the first request further includes a client capability, and the routing or forwarding system establishing a connection with the SDN control client includes:

determining, by the routing or forwarding system, whether a locally stored capability has an intersection with the client capability; and when the locally stored capability has the intersection with the client capability, establishing, by the routing or forwarding system, the connection with the SDN control client.

In one embodiment, when the priority is carried in the first request, after the routing or forwarding system establishes the connection with the SDN control client, the method further includes: after the connection is interrupted between the routing or forwarding system and the SDN control client, receiving, by the routing or forwarding system, a second request for establishing another connection sent by the SDN control client, wherein the second request carries the identifier and an original priority of the SDN control client, or the identifier and a modified priority of the SDN control client.

In another embodiment of the present disclosure, a device for processing at least one of routing status and policy information is provided, which is located at a routing or forwarding system side, including: a first receiving component to receive a first request for establishing a connection sent by a Software Defined Networking (SDN) control client, wherein the first request carries an identifier of the SDN control client; an establishment component to establish a corresponding relationship between at least one of routing status and policy information sent by the SDN control client and the identifier; and a management component to manage the at least one of routing status and policy information according to the corresponding relationship.

In one embodiment, the device further includes: a setting component, which is configured to set a mapping relationship between the identifier and a priority of the SDN control client; and a marking component, which is configured to mark the priority of the SDN control client corresponding to the identifier on at least one of the routing status and policy information sent by the SDN control client according to the mapping relationship.

In one embodiment, the device further includes: a handling component to, when a plurality of SDN control clients have a conflict in operating at least one of the routing status and policy information, handle the conflict according to the priority marked on at least one of the routing status and policy information.

In one embodiment, the handling component is further arranged to trigger the SDN control client to handle at least one of the routing status and policy information of the SDN control client and at least one of the routing status and policy information of at least one SDN control client with a priority lower than the priority of the SDN control client, wherein handling operations include at least one of the following: modification operation and deletion operation.

In one embodiment, a priority is configured by the SDN control client and carried in the first request or is an initial configuration provided by the routing or forwarding system, and the identifier is a global unique identifier.

In one embodiment, the first request further includes a client capability, and the first receiving component includes: a determination element to determine whether a locally stored capability has an intersection with the client capability; and an establishment element to, when the locally stored capability has the intersection with the client capability, establishing, establish the connection with the SDN control client.

In one embodiment, the device further includes: a second receiving component to, after the connection is interrupted between the routing or forwarding system and the SDN control client, receive a second request for establishing another connection sent by the SDN control client, wherein the second request carries the identifier and an original priority of the SDN control client, or the identifier and a modified priority of the SDN control client.

In another embodiment of the present disclosure, a device for processing at least one of routing status and policy information is provided, which is located at a Software Defined Network (SDN) control client side, including: a first sending component to send a third request for establishing a connection, wherein the third request carries an identifier of the SDN control client, the identifier is used for establishing a corresponding relationship between the SDN control client and at least one of routing status and policy information at a routing or forwarding system side; a second sending component to send at least one of routing status and policy information to the routing or forwarding system after the routing or forwarding system establishes the connection with the SDN control client. In one embodiment, the third request further includes a priority of the SDN control client, wherein the priority is used for marking at least one of the routing status and policy information at the routing or forwarding system side.

Through the at least some embodiments of the present disclosure, the identifier of the SDN control client is carried in the first request for establishing a connection, a corresponding relationship is established between at least one of the routing status and policy information sent by the SDN control client and the identifier, and then the routing or forwarding system realizes the management of at least one of the routing status and policy information through the corresponding relationship. The problem that at least one of the routing status and policy information of home control clients are not distinguished in the related art is solved. And accurate management of at least one of the routing status and policy information is realized.

BRIEF DESCRIPTION OF THE DRAWINGS

For a better understanding of the present disclosure, accompanying drawings described hereinafter are provided to constitute one part of the application. The schematic embodiments of the present disclosure and the description thereof are used to illustrate the present disclosure but to limit the present disclosure improperly. In the accompanying drawings.

DETAILED DESCRIPTION

Figure 1:
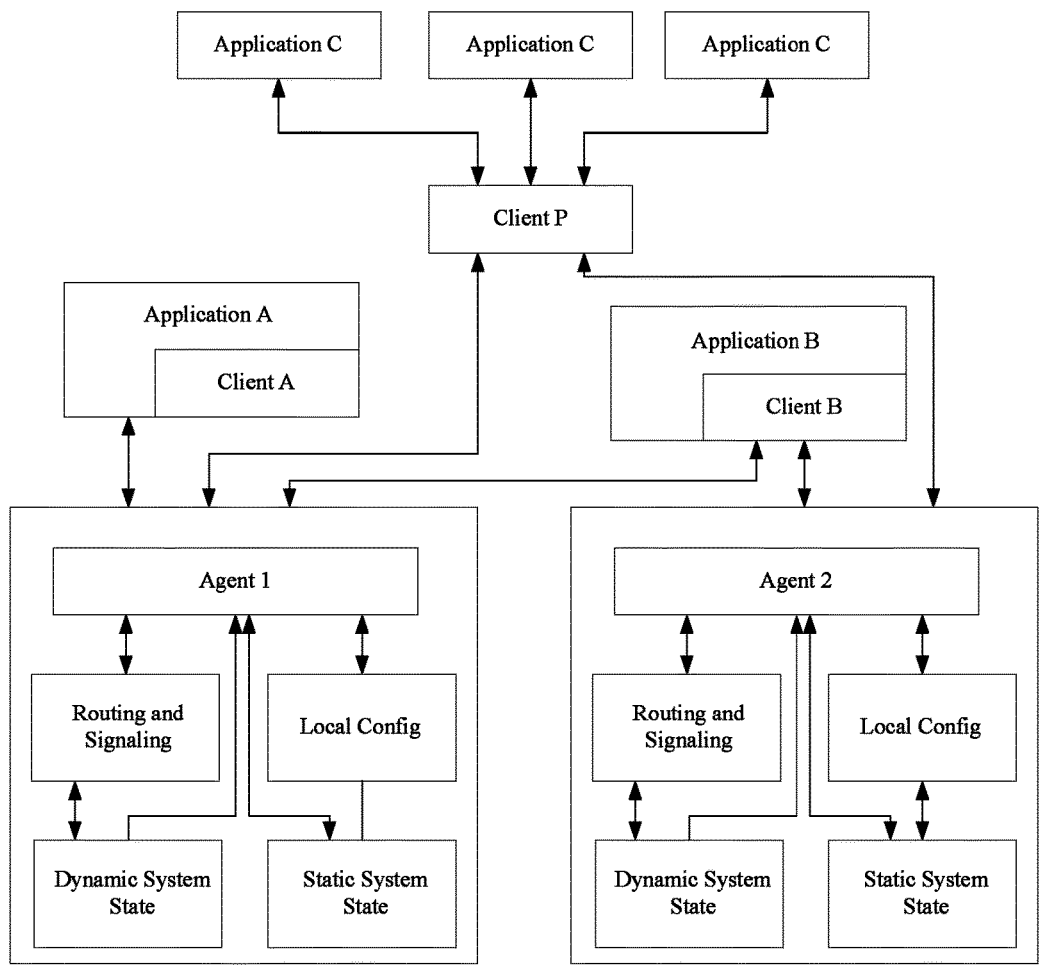
FIG. 1 is a structural block diagram of an I2R2 system in the related art.
Figure 2:
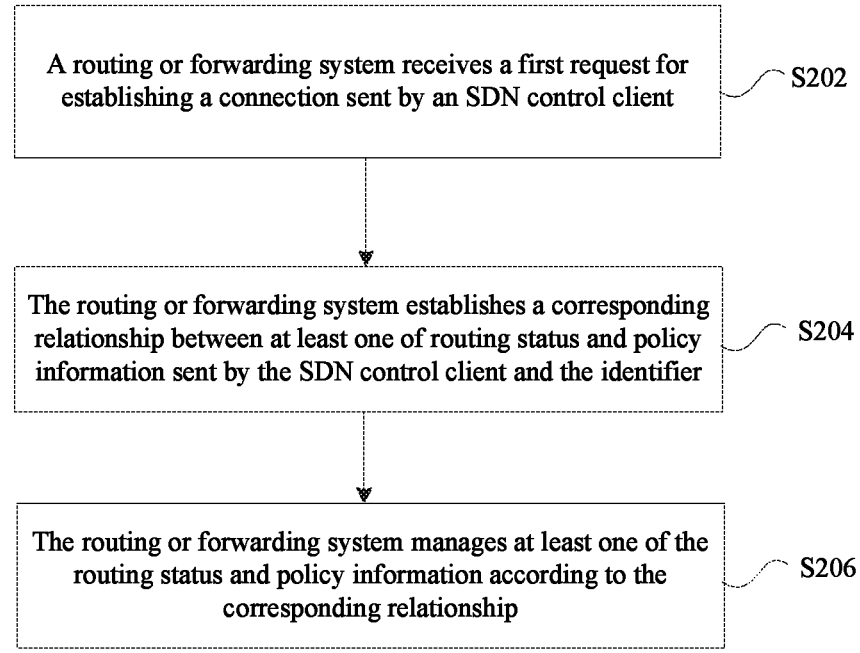
FIG. 2 is a flowchart of a method for processing at least one of routing status and policy information according to a first exemplary embodiment of the present disclosure.

It should be noted that embodiments in the application and characteristics of the embodiments are combined if no conflict is caused. The present disclosure is described below in detail with reference to the accompanying drawings in conjunction with embodiments. This embodiment provides a method for processing at least one of routing status and policy information. FIG. 2 is a flowchart of a method for processing at least one of routing status and policy information according to a first exemplary embodiment of the present disclosure. As shown in FIG. 2, the method includes the following steps.

At step S202, a routing or forwarding system receives a first request for establishing a connection sent by an SDN control client.

Herein, the first request carries an identifier of the SDN control client. At step S204, the routing or forwarding system establishes a corresponding relationship between at least one of routing status and policy information sent by the SDN control client and the identifier.

At step S206, the routing or forwarding system manages at least one of the routing status and policy information according to the corresponding relationship.

In this embodiment, the identifier of the SDN control client is carried in the first request for establishing the connection, a corresponding relationship is established between at least one of the routing status and policy information sent by the SDN control client and the identifier, and then the routing or forwarding system realizes the management of the routing status and policy information through the corresponding relationship. The problem that at least one of the routing status and policy information of home control clients are not distinguished in the related art is solved. And accurate management of at least one of the routing status and policy information is realized.

In one optional embodiment, after the routing or forwarding system establishes the connection with the SDN control client, the method of further includes the following steps.

At step S11, the routing or forwarding system sets a mapping relationship between the identifier and a priority of the SDN control client.

At step S12, the routing or forwarding system marks the priority of the SDN control client corresponding to the identifier on at least one of the routing status and policy information sent by the SDN control client according to the mapping relationship.

At step S13, when a plurality of SDN control clients have a conflict in operating at least one of the routing status and policy information, the routing or forwarding system handles the conflict according to the priority marked on at least one of the routing status and policy information.

Through the above steps S11 to S13, the way of marking at least one of the routing status and policy information using a priority realizes the accurate control of the routing or forwarding system by the SDN control client. In addition, in an application scene of this embodiment, if the plurality of SDN control clients have the conflict, the conflict problem is solved through the priority marked on at least one of the routing status and policy information in this embodiment. It should be noted that the above application scene is one optional application scene of the embodiment of the present disclosure, and users apply the technical scheme in the embodiment of the present disclosure to other scenes as needed.

In view of the above application scene that the plurality of SDN control clients have the conflict, in one embodiment, following ways are optionally adopted: the routing or forwarding system triggers the SDN control client to handle at least one of the routing status and policy information of the SDN control client and at least one of the routing status and policy information of a SDN control client having a priority lower than the priority of the SDN control client The handling operations includes at least one of the following: modification operation and deletion operation.

The priority involved in this embodiment is configured by the SDN control client and carried in the first request or is an initial configuration provided by the routing or forwarding system, and the identifier involved in this embodiment is a global unique identifier.

In another optional implementation of this embodiment, the first request further includes a client capability, through which the connection between the SDN control client and the routing or forwarding system is realized, the way of realizing the connection includes the following steps.

At step S21, the routing or forwarding system determines whether a locally stored capability has an intersection with the client capability.

At step S22, when the locally stored capability has the intersection with the client capability, the routing or forwarding system establishes the connection with the SDN control client.

For the SDN control client in this embodiment, when the priority is carried in the first request, after the routing or forwarding system establishes the connection with the SDN control client, the method of this embodiment further includes: after the connection is interrupted between the routing or forwarding system and the SDN control client, the routing or forwarding system receives a second request for establishing another connection sent by the SDN control client. The second request carries the identifier and an original priority of the SDN control client, or the identifier and a modified priority of the SDN control client.

Figure 3:
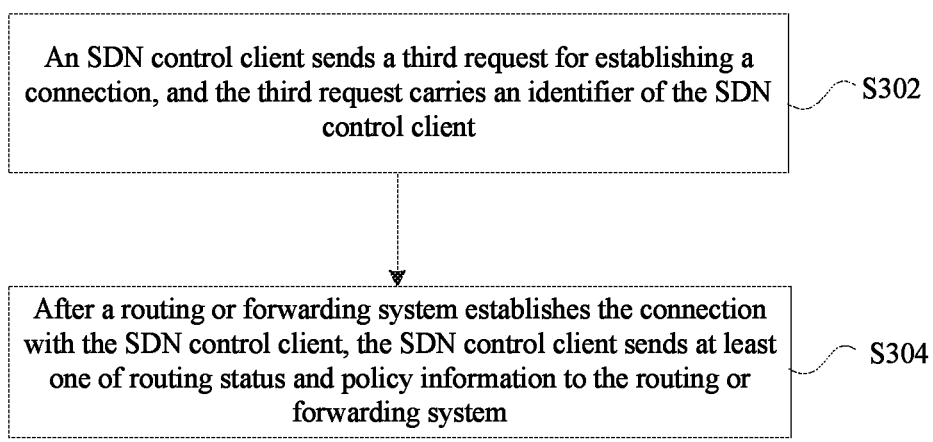
FIG. 3 is a flowchart of a method for processing at least one of routing status and policy information according to a second exemplary embodiment of the present disclosure.

FIG. 3 is a flowchart of a method for processing at least one of routing status and policy information according to a second exemplary embodiment of the present disclosure. As shown in FIG. 3, the method includes the following steps.

At step S302, an SDN control client sends a third request for establishing a connection, and the third request carries an identifier of the SDN control client.

Herein, the identifier is used for establishing a corresponding relationship between the SDN control client and at least one of routing status and policy information at a routing or forwarding system side.

At step S304, after a routing or forwarding system establishes the connection with the SDN control client, the SDN control client sends at least one of routing status and policy information to the routing or forwarding system.

Optionally, the third request further includes a priority of the SDN control client, and the priority is used for marking at least one of the routing status and policy information at the routing or forwarding system side.

Figure 4:
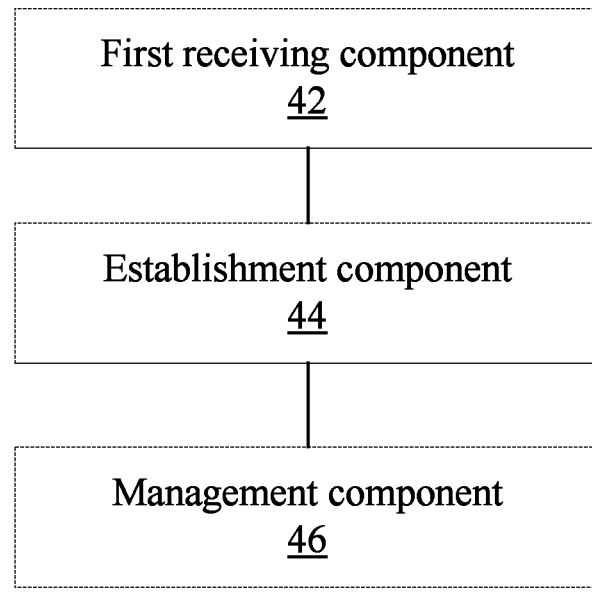
FIG. 4 is a structural block diagram of a device for processing at least one of routing status and policy information according to a first exemplary embodiment of the present disclosure.

FIG. 4 is a structural block diagram of a device for processing at least one of routing status and policy information according to a first exemplary embodiment of the present disclosure. The device is located at a routing or forwarding system side. As shown in FIG. 4, the device includes: a first receiving component 42, which is arranged to receive a first request for establishing a connection sent by a SDN control client, wherein the first request carries an identifier of the SDN control client; an establishment component 44, which is coupled with the first receiving component 42 and is arranged to establish a corresponding relationship between at least one of routing status and policy information sent by the SDN control client and the identifier; and a management component 46, which is coupled with the establishment component 44 and is arranged to manage at least one of the routing status and policy information according to the corresponding relationship.

Optionally, the device further includes: a setting component, which is coupled with the establishment component 44 and is arranged to set a mapping relationship between the identifier and a priority of the SDN control client; and a marking component, which is coupled with the setting component and is arranged to mark the priority of the SDN control client corresponding to the identifier on at least one of the routing status and policy information sent by the SDN control client according to the mapping relationship.

Optionally, the device further includes a handling component, which is coupled with the marking component and is arranged to, when a plurality of SDN control clients have a conflict in operating at least one of the routing status and policy information, handle the conflict according to the priority marked on at least one of the routing status and policy information. Herein, the handling component is further arranged to trigger the SDN control client to handle at least one of the routing status and policy information of the SDN control client and at least one of the routing status and policy information of at least one SDN control client with a priority lower than the priority of the SDN control client, and the handling operations includes at least one of the following: modification operation and deletion operation.

The priority involved in this embodiment is configured by the SDN control client and carried in the first request or is an initial configuration provided by the routing or forwarding system, and the identifier involved in this embodiment is a global unique identifier.

Optionally, the first request further includes a client capability, and the first receiving component includes: a determination element, which is arranged to determine whether a locally stored capability has an intersection with the client capability; and an establishment element, which is coupled with the determination element and is arranged to establish the connection with the SDN control client when the locally stored capability has the intersection with the client capability.

Optionally, the device includes a second receiving component, which is arranged to, after the connection is interrupted between the routing or forwarding system and the SDN control client, receive a second request for establishing another connection sent by the SDN control client used. The second request carries the identifier and an original priority of the SDN control client, or the identifier and a modified priority of the SDN control client.

Figure 5:
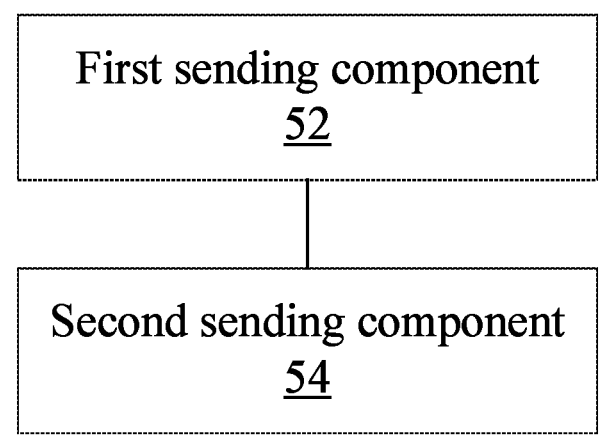
FIG. 5 is a structural block diagram of a device for processing at least one of routing status and policy information according to a second exemplary embodiment of the present disclosure.

FIG. 5 is a structural block diagram of a device for processing at least one of routing status and policy information according to a second exemplary embodiment of the present disclosure. The device is located at an SDN control client side. As shown in FIG. 5, the device includes: a first sending component 52, which is arranged to send a third request for establishing a connection, and the third request carries an identifier of the SDN control client, the identifier is used for establishing a corresponding relationship between the SDN control client and at least one of routing status and policy information at a routing or forwarding system side; a second sending component 54, which is coupled with the first sending component 52 and is arranged to send at least one of routing status and policy information to the routing or forwarding system after the routing or forwarding system establishes the connection with the SDN control client.

Optionally, the third request further includes a priority of the SDN control client, and the priority is used for marking at least one of the routing status and policy information at the routing or forwarding system side.

The present disclosure is described below by way of example through optional embodiments of the present disclosure.

This optional embodiment provides a method for processing identity and priority of an SDN control client, in which, the exchange and identification of the identity and priority of the control client are accomplished during a process of the SDN control client establishing a communication link and performing capability exchange with a routing or forwarding system device agent. And the agent maintains a relationship between at least one of the routing status and policy transmitted by the control client and the home client of the agent, so that the accurate control of the routing or forwarding system by the SDN control client and the multi-client conflict management function are realized.

Herein, the method for processing the identity and priority of the SDN control client includes the following steps.

At step S402, the SDN control client initiates a control connection carrying a unique identifier, a priority and a client capability of the SDN control client to the routing or forwarding system device agent.

Herein, the capability of the SDN control client is used for accomplishing capability exchange when establishing a link with the agent. In addition, the SDN control client has a plurality of identifiers, however, at least one global unique identifier is to be carried in the link establishment request message.

Optionally, the global unique identifier and the priority of the SDN control client are uniformly assigned and maintained by a higher-layer control plane according to certain rules. However, when the SDN control client initiates the link establishment request message, the priority of the SDN control client is not necessarily carried. If the priority of the SDN control client is not carried in the link establishment request message, the routing or forwarding system device gives a default-level priority to the SDN control client.

After the SDN control client initiates the request of link establishment, the SDN control client interrupts the connection already initiated, modifies the priority of the SDN control client, and then reestablishes another connection using the same identity and capability.

At step S404, the routing or forwarding system device agent receives the first request initiated by the SDN control client, accomplishes capability exchange, establishes a mapping relationship between the SDN control client and the identify and priority of the SDN control client, stores the mapping relationship and finally accomplishes the communication connection establishment.

Optionally, the way of accomplishing the communication connection establishment through capability exchange is realized through the following steps: the routing or forwarding system device agent compares whether the SDN control client and the routing or forwarding system device agent have an intersection in capability. When the SDN control client and the routing or forwarding system device agent have a necessary capability intersection, the connection is normally established; otherwise, the connection is not established.

After the routing or forwarding system device agent establishes the connection with the SDN control client, the routing or forwarding system device agent stores the identity and priority information and establishes a mapping relationship between the identity and priority information and the connection.

After the mapping relationship is established, the routing or forwarding system device agent sends a response message of connection establishment to the SDN control client. The communication connection is established formally.

At step S406, the SDN control client sends at least one of routing status and policy information to the routing or forwarding system device.

Herein, the SDN control client sends at least one of the routing status and policy information to the routing or forwarding system device through the specified connection. However, at least one of the routing status and policy information is sent without carrying the identity information.

At step S408, the routing or forwarding system device agent marks at least one of the routing status and policy information with the identity and priority of the SDN control client, according to a mapping relationship between the SDN control client and the identity and priority of the SDN control client.

Optionally, the routing or forwarding system device determines the control client sending at least one of the routing status and policy information and the identity and priority of the SDN control client according to the connection. And then the routing or forwarding system device marks at least one of the routing status and policy information with the identity and priority of the SDN control client.

At step S410, when a plurality of control clients have a conflict in operation, the routing or forwarding system device agent handles the conflict according to the priority of at least one of the routing status and policy information.

Herein, the plurality of control clients are multiple SDN control clients, or are a mixture of SDN control clients and traditional control clients. Each SDN control client carries a priority or is assigned with a priority. In the condition of operational context conflict, the routing or forwarding system device determines according to the priority whether the current operation client modifies and/or deletes the target information. In this optional embodiment, the SDN control client modifies and/or deletes at least one of the routing status and policy information transmitted by a control client having a priority lower than the priority of the control client.

At S412, each SDN control client updates and maintains at least one of the routing status and policy information transmitted by the SDN control client.

Herein, the operation of each control client updating and maintaining at least one of the routing status and policy information transmitted by the control client includes a at least one of the follwoing: adding, deleting, modifying and searching.

In addition, the control client also searches all the routing status and/or policy information on the routing or forwarding system device.

In this optional embodiment, the exchange and identification of the identity and priority of the control client are accomplished during the process of the SDN control client establishing a communication link and performing capability exchange with the routing or forwarding system device. And the agent maintains the relationship between at least one of the routing status and policy transmitted by the control client and the home client of the agent, so that the accurate control of the routing or forwarding system by the SDN control client is realized and the multi-client conflict management function may be realized on this basis.

This optional embodiment is described below by way of example in conjunction with accompanying drawings and the embodiment of this optional embodiment.

Embodiment One

Figure 6:
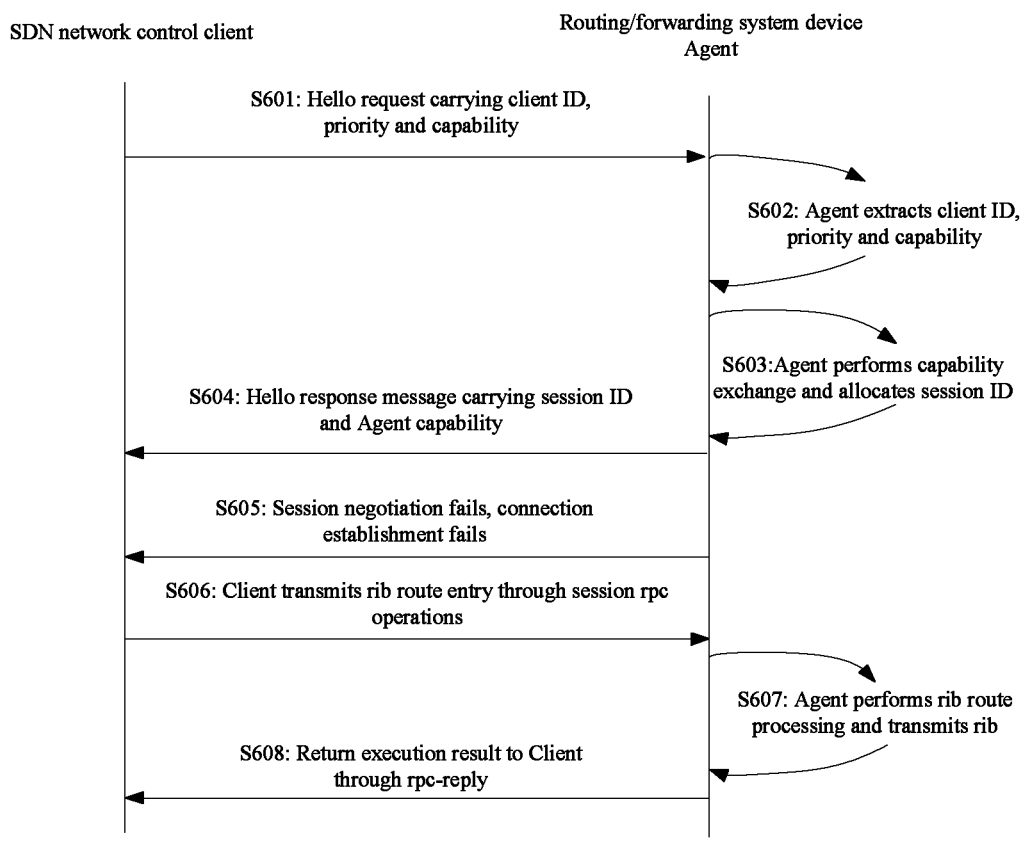
FIG. 6 is a flowchart of a method of an SDN control client establishing a connection with a routing or forwarding system device according to a first exemplary embodiment of the present disclosure.

An SDN control client establishes a connection with a routing or forwarding system device, taking a NETCONF connection for example. And after the connection is successfully established, the SDN control client transmits at least one of routing status and policy information to the routing or forwarding system device, taking a rib route for example. FIG. 6 is a flowchart of method of an SDN control client establishing a connection with a routing or forwarding system device according to a first exemplary embodiment of the present disclosure. As shown in FIG. 6, the process includes the following steps.

At step S601, the SDN control client initiates a hello request (NETCONF link establishment request) to the routing or forwarding system device, and the hello request carries a client identity Client ID, a priority and a capability of the SDN control client. Optionally, the hello message of the link establishment of the SDN control client is as follows:

```
<hello xmlns="urn:ietf:params:xml:ns:netconf:base:1.0">
    <capabilities>
<capability>urn:ietf:params:netconf:base:1.1</capability>
<capability>urn:ietf:params:netconf:capability:candidate:1.0</capability>
<capability>urn:ietf:params:netconf:capability:rollback-on-error:1.0</capability>
        <capability>http://www.zte.com.cn/zxr10/netconf/capabilities/action:1.0</capability>
        <capability>http://www.zte.com.cn/zxr10/netconf/capabilities/bulk-retrieve1.0</capability>
        ... ...
    </capabilities>
    <client-id>test</client-id>
```

```
<priority>100</priority>
</hello>
```

At step S602, the routing or forwarding system device receives the hello message sent by the SDN control client and performs information extraction.

Herein, the routing or forwarding system extracts the identity Client ID, priority and capability information of the control client.

At step S603, the routing or forwarding system device makes negotiation between the capability information extracted in step S602 and the capability supported by the current system (that is, performing capability exchange, allocating session).

At step S604, if the routing or forwarding system device and the control client succeed in the capability negotiation, the routing or forwarding system device sends a connection establishment response hello message to the control client. The session is successfully established.

Herein, the routing or forwarding system device allocates a connection session ID for this connection, and the hello message sent to the control client carries the capability information of the routing or forwarding system device.

The response message involved in this optional embodiment is realized through the following ways:

```
<hello xmlns="urn:ietf:params:xml:ns:netconf:base:1.0">
  <capabilities>
    <capability>
      urn:ietf:params:netconf:base:1.0
    </capability>
    <capability>
      urn:ietf:params:netconf:base:1.1
    </capability>
    <capability>
      urn:ietf:params:netconf:capability:candidate:1.0
    </capability>
    <capability>
      urn:ietf:params:netconf:capability:rollback-on-error:1.0
    </capability>
    <capability>
      http://www.zte.com.cn/zxr10/netconf/capabilities/action:1.0
    </capability>
    <capability>
      http://www.zte.com.cn/zxr10/netconf/capabilities/bulk-retrieve1.0
    </capability>
    ... ...
  <capabilities>
  <session-id>1</session-id>
</hello>
```

At step S605, if the routing or forwarding system device and the control client fail in the capability negotiation, the routing or forwarding system device sends a connection establishment failure response message to the control client.

At step S606, after the SDN control client and the routing or forwarding system device establish a connection normally, the SDN control client transmits rib route entry information to the routing or forwarding system device.

At step S607, the routing or forwarding system device receives the rib route entry information, marks relevant information with the ID and priority of the SDN control client, performs route computation and decision and then transmits to fib.

At step S608, an execution result is returned to the Client through rpc-reply.

Embodiment Two

Figure 7:
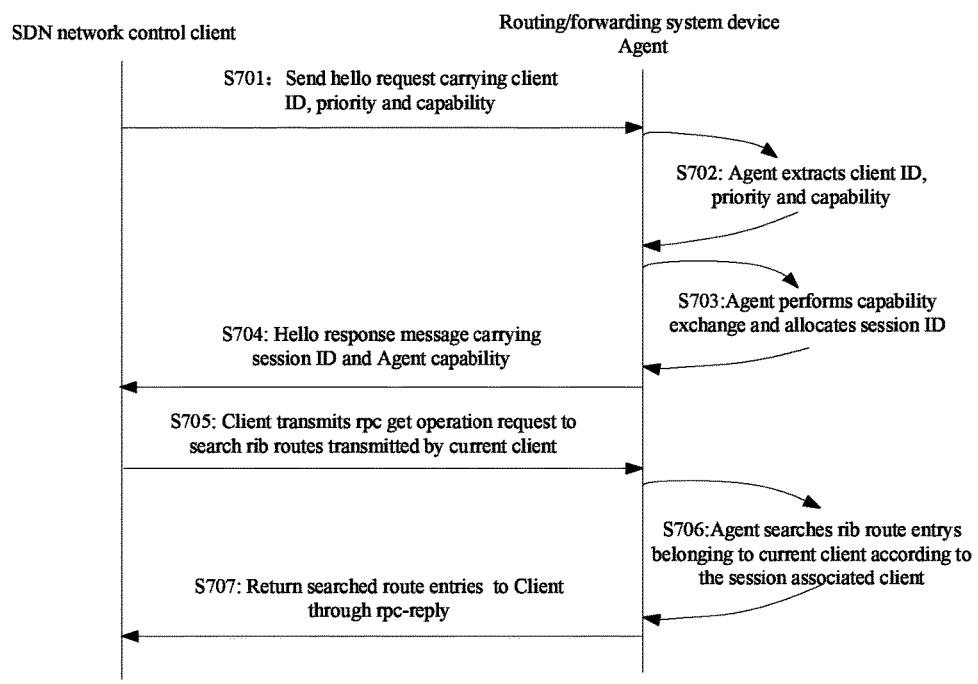
FIG. 7 is a flowchart of a method of an SDN control client establishing a connection with a routing or forwarding system device according to a second exemplary embodiment of the present disclosure.

An SDN control client establishes a connection with a routing or forwarding system device, taking a NETCONF connection for example. And after the connection is successfully established, the SDN control client requests the routing or forwarding system device to search the routing information transmitted by the client, taking a rib route for example. FIG. 7 is a flowchart of method of an SDN control client establishing a connection with a routing or forwarding system device according to a second exemplary embodiment of the present disclosure. As shown in FIG. 7, the process includes the following steps.

At step S701, the SDN control client initiates a hello request (NETCONF link establishment request) to the routing or forwarding system device. The hello request carries a client identity Client ID, a priority and a capability of the SDN control client.

At step S702: the routing or forwarding system device receives the hello message sent by the SDN control client and performs information extraction.

Herein, the routing or forwarding system extracts the identity Client ID, priority and capability information of the control client.

At step S703: the routing or forwarding system device makes negotiation between the capability information extracted in step S702 and the capability supported by the current system.

At step S704: if the routing or forwarding system device and the control client succeed in the capability negotiation, the routing or forwarding system device sends a connection establishment response hello message to the control client. The session is successfully established.

In the embodiment of the present disclosure, the routing or forwarding system device allocates a connection session ID for this connection.

In the embodiment of the present disclosure, the hello message sent to the control client by the routing or forwarding system device carries the capability information of the routing or forwarding system.

At step S705, after the SDN control client and the routing or forwarding system device establish a connection normally, the SDN control client transmits to the routing or forwarding system device a request about the rib route entry transmitted by the current client.

In the embodiment of the present disclosure, the content of the request message transmitted by the SDN control client is as follows. It can be determined through an operation option Private whether to acquire the rib entry transmitted by the current client, true indicates to acquire the rib entry transmitted by the current client. False or no identifier indicates to acquire all rib entries on the routing or forwarding system device.

```
<rpc message-id="101"
xmlns="urn:ietf:params:xml:ns:netconf:base:1.0">
<get>
<private>true</private>
<filter type="subtree">
<rib:rib>
<rib:rib-infos/>
```

```
</rib:rib>
</filter>
</get>
</rpc>
```

At step S706, the routing or forwarding system device finds the Clint ID of the client according to the connection ID and searches the rib route entry marked with the Client ID, packages the rib route entry into a NETCONF message and sends to the control client.

At step S707: the searched route entry is returned to the Client through rpc-reply.

Embodiment Three

Figure 8:
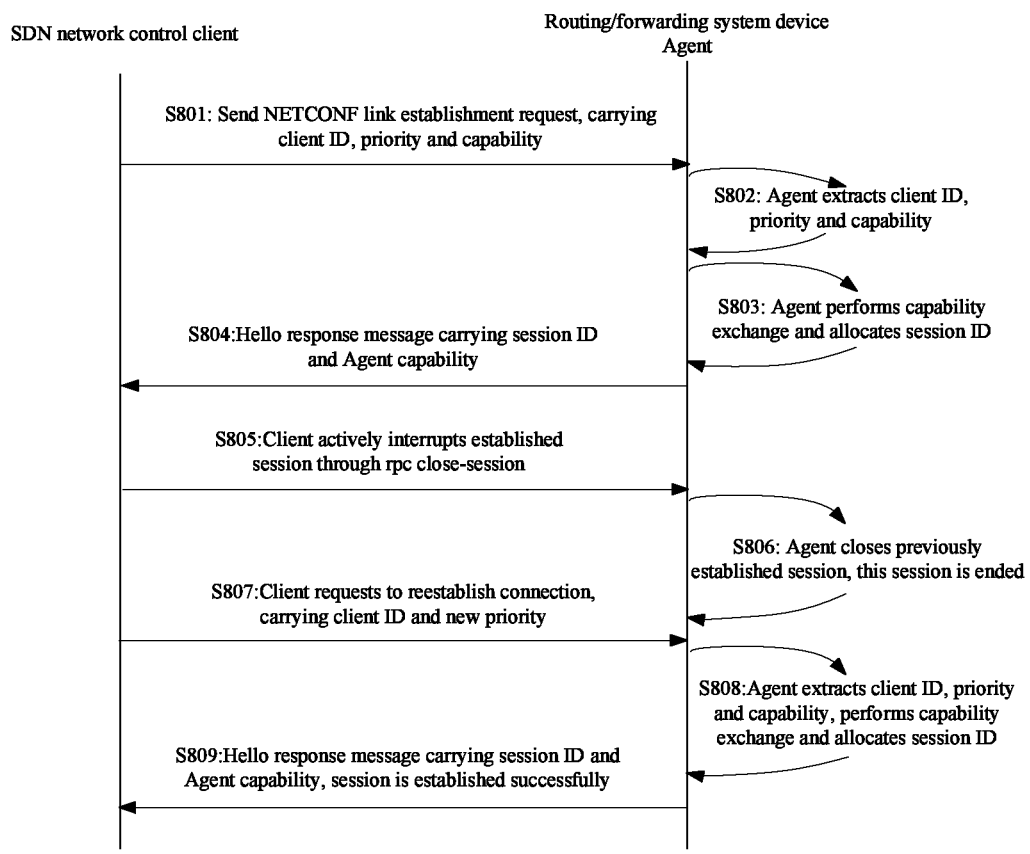
FIG. 8 is a flowchart of a method of an SDN control client establishing a connection with a routing or forwarding system device according to a third exemplary embodiment of the present disclosure.

An SDN control client establishes a connection with a routing or forwarding system device, taking a NETCONF connection for example. After the connection is successfully established, the SDN control client interrupts the connection actively, modifies the priority of the SDN control client, and reestablishes another connection with the routing or forwarding system device using the new priority. FIG. 8 is a flowchart of method of an SDN control client establishing a connection with a routing or forwarding system device according to a third exemplary embodiment of the present disclosure. As shown in FIG. 8, the process includes the following steps.

At step S801, the SDN control client initiates a hello request (NETCONF link establishment request) to the routing or forwarding system device. The hello request carries a client identity Client ID, a priority and a capability of the SDN control client.

At step S802: the routing or forwarding system device receives the hello message sent by the SDN control client and performs information extraction.

Herein, the routing or forwarding system extracts the identity Client ID, priority and capability information of the control client.

At step S803: the routing or forwarding system device makes negotiation between the capability information extracted in step S802 and the capability supported by the current system.

At step S804: if the routing or forwarding system device and the control client succeed in the capability negotiation, the routing or forwarding system device sends a connection establishment response hello message to the control client. The session is successfully established.

Herein, the routing or forwarding system device allocates a connection session ID for this connection. The hello message sent to the control client by the routing or forwarding system device carries the capability information of the routing or forwarding system.

At step S805, the SDN control client actively interrupts the connection with the routing or forwarding system device through a close-session.

At step S806, the routing or forwarding system device responds to the close-session operation and interrupts the connection.

At step S807, the SDN control client reinitiates a link establishment hello request, also carrying the Client ID and new priority and capability of the SDN control client.

At step S808, the routing or forwarding system device receives the request from the control client, extracts the session information, performs capability negotiation successfully and allocates a connection session ID.

At step S809, the routing or forwarding system device sends a connection establishment response hello message to the control client. The session is established successfully. The SDN control client and the routing or forwarding system device communicate with each other through the new connection.

The connection between the SDN control client and the routing or forwarding system device is not limited to NETCONF, but is RESTCONF or other connection modes. The present disclosure is not influenced by the connection mode between the SDN control client and the routing or forwarding system device.

Through the embodiment of this optional embodiment, the exchange and identification of the identity and priority of the control client are accomplished during the process of the SDN control client establishing a communication link and performing capability exchange with the routing or forwarding system device. And the agent maintains the relationship between at least one of the routing status and policy transmitted by the control client and the home client of the agent, so that the accurate control of the routing or forwarding system by the SDN control client and the multi-client conflict management function are realized.

Obviously, those skilled in the art should understand that the components or steps described above are implemented by a common computer device. The components or steps are integrated on a single computing device or distributed on a network composed of a plurality of computing devices. Optionally, the components or steps are implemented by a programming code executable by a computing device, thus they are stored in a storage device to be executed by a computing device and executed in a different order in some cases, or manufactured into individual integrated circuit component respectively, or several of them may be manufactured into a single integrated circuit component to implement. In this way, the present disclosure is not limited to any combination of specific hardware and software.

The above are merely optional embodiments of the present disclosure and not intended to limit the present disclosure. For those skilled in the art, various modifications and changes may be made to the present disclosure. Any modification, equivalent substitution and improvement made within the the scope as claimed in claims of the present disclosure are intended to be included within the scope of protection of the present disclosure.

INDUSTRIAL APPLICABILITY

The technical scheme provided by the embodiment of the present disclosure is applied to a processing procedure of at least one of routing state and policy information. The identifier of the SDN control client is carried in the first request for establishing a connection, a corresponding relationship is established between at least one of the routing status and policy information sent by the SDN control client and the identifier, and then the routing or forwarding system realizes the management of at least one of the routing status and policy information through the corresponding relationship. The problem that at least one of the routing status and policy information of home control clients are not distinguished in the related art is solved. And accurate management of at least one of the routing status and policy information is realized.

What is claimed is:

1. A method for processing at least one of routing status and policy information, comprising:
   receiving, by a routing or forwarding system, a first request for establishing a connection sent by a Software Defined Network (SDN) control client, wherein the first request carries an identifier of the SDN control client;

establishing, by the routing or forwarding system, a corresponding relationship between at least one of routing status and policy information sent by the SDN control client and the identifier; and managing, by the routing or forwarding system, at least one of the routing status and policy information according to the corresponding relationship;

wherein after the routing or forwarding system establishes the connection with the SDN control client, the method further comprises: setting, by the routing or forwarding system, a mapping relationship between the identifier and a priority of the SDN control client and marking, by the routing or forwarding system, the priority of the SDN control client corresponding to the identifier on at least one of the routing status and policy information sent by the SDN control client according to the mapping relationship;

wherein after marking, by the routing or forwarding system, the priority of the SDN control client corresponding to the identifier on at least one of the routing status and policy information sent by the SDN control client according to the mapping relationship, the method further comprises: when a plurality of SDN control clients have a conflict in operating at least one of the routing status and policy information, handling, by the routing or forwarding system, the conflict according to the priority marked on at least one of the routing status and policy information.

2. The method as claimed in claim 1, wherein handling, by the routing or forwarding system, the conflict according to the priority marked on at least one of the routing status and policy information comprises:

triggering, by the routing or forwarding system, the SDN control client to handle at least one of the routing status and policy information of the SDN control client and at least one of the routing status and policy information of at least one SDN control client with a priority lower than the priority of the SDN control client, wherein handling operations comprise at least one of the following: modification operation and deletion operation.

3. The method as claimed in claim 1, wherein a priority is configured by the SDN control client and carried in the first request or is an initial configuration provided by the routing or forwarding system, and the identifier is a global unique identifier.

4. The method as claimed in claim 3, wherein the first request further comprises a client capability, and the routing or forwarding system establishing a connection with the SDN control client comprises:

determining, by the routing or forwarding system, whether a locally stored capability has an intersection with the client capability; and when the locally stored capability has the intersection with the client capability, establishing, by the routing or forwarding system, the connection with the SDN control client.

5. The method as claimed in claim 4, wherein when the priority is carried in the first request, after the routing or forwarding system establishes the connection with the SDN control client, the method further comprises:

after the connection is interrupted between the routing or forwarding system and the SDN control client, receiving, by the routing or forwarding system, a second request for establishing another connection sent by the SDN control client, wherein the second request carries the identifier and an original priority of the SDN control client, or the identifier and a modified priority of the SDN control client.

6. A method for processing at least one of routing status and policy information, comprising:

sending, by a Software Defined Network (SDN) control client, a third request for establishing a connection, wherein the third request carries an identifier of the SDN control client, the identifier is used for establishing a corresponding relationship between the SDN control client and at least one of routing status and policy information at a routing or forwarding system side;

after the routing or forwarding system establishes the connection with the SDN control client, sending, by the SDN control client, at least one of routing status and policy information to the routing or forwarding system;

wherein the third request further comprises a priority of the SDN control client, wherein the priority is used for marking at least one of the routing status and policy information at the routing or forwarding system side, to make the routing or forwarding system handle the conflict according to the priority marked on at least one of the routing status and policy information, when a plurality of SDN control clients have a conflict in operating at least one of the routing status and policy information.

7. A device for processing at least one of routing status and policy information, which is located at a routing or forwarding system side, comprising:

a first receiving component to receive a first request for establishing a connection sent by a Software Defined Networking (SDN) control client , wherein the first request carries an identifier of the SDN control client;

an establishment component to establish a corresponding relationship between at least one of routing status and policy information sent by the SDN control client and the identifier; and a management component to manage the at least one of routing status and policy information according to the corresponding relationship;

wherein further comprising: a setting component, which is configured to set a mapping relationship between the identifier and a priority of the SDN control client and a marking component, which is configured to mark the priority of the SDN control client corresponding to the identifier on at least one of the routing status and policy information sent by the SDN control client according to the mapping relationship;

wherein further comprising: a handling component to, when a plurality of SDN control clients have a conflict in operating at least one of the routing status and policy information, handle the conflict according to the priority marked on at least one of the routing status and policy information.

8. The device as claimed in claim 7, wherein the handling component is further arranged to trigger the SDN control client to handle at least one of the routing status and policy information of the SDN control client and at least one of the routing status and policy information of at least one SDN control client with a priority lower than the priority of the SDN control client, wherein handling operations comprise at least one of the following: modification operation and deletion operation.

9. The device as claimed in claim 7, wherein a priority is configured by the SDN control client and carried in the first request or is an initial configuration provided by the routing or forwarding system, and the identifier is a global unique identifier.

10. The device as claimed in claim 9, wherein the first request further comprises a client capability, and the first receiving component comprises:
- a determination element to determine whether a locally stored capability has an intersection with the client capability; and
- an establishment element to, when the locally stored capability has the intersection with the client capability, establishing, establish the connection with the SDN control client.

11. The device as claimed in claim 10, wherein comprising:
- a second receiving component to, after the connection is interrupted between the routing or forwarding system and the SDN control client, receive a second request for establishing another connection sent by the SDN control client , wherein the second request carries the identifier and an original priority of the SDN control client, or the identifier and a modified priority of the SDN control client.

12. A device for processing at least one of routing status and policy information, which is located at a Software Defined Network (SDN) control client side, comprising:
- a first sending component to send a third request for establishing a connection, wherein the third request carries an identifier of the SDN control client, the identifier is used for establishing a corresponding relationship between the SDN control client and at least one of routing status and policy information at a routing or forwarding system side;
- a second sending component to send at least one of routing status and policy information to the routing or forwarding system after the routing or forwarding system establishes the connection with the SDN control client wherein the third request further comprises a priority of the SDN control client, wherein the priority is used for marking at least one of the routing status and policy information at the routing or forwarding system side, to make the routing or forwarding system handle the conflict according to the priority marked on at least one of the routing status and policy information, when a plurality of SDN control clients have a conflict in operating at least one of the routing status and policy information.

\* \* \* \* \*